June 23, 1970  G. E. LEWIS  3,516,491

UNDERWATER CONTROL SYSTEM

Original Filed Oct. 14, 1963  6 Sheets-Sheet 1

INVENTOR.
GEORGE E. LEWIS
BY Whit & Haefliger
ATTORNEYS.

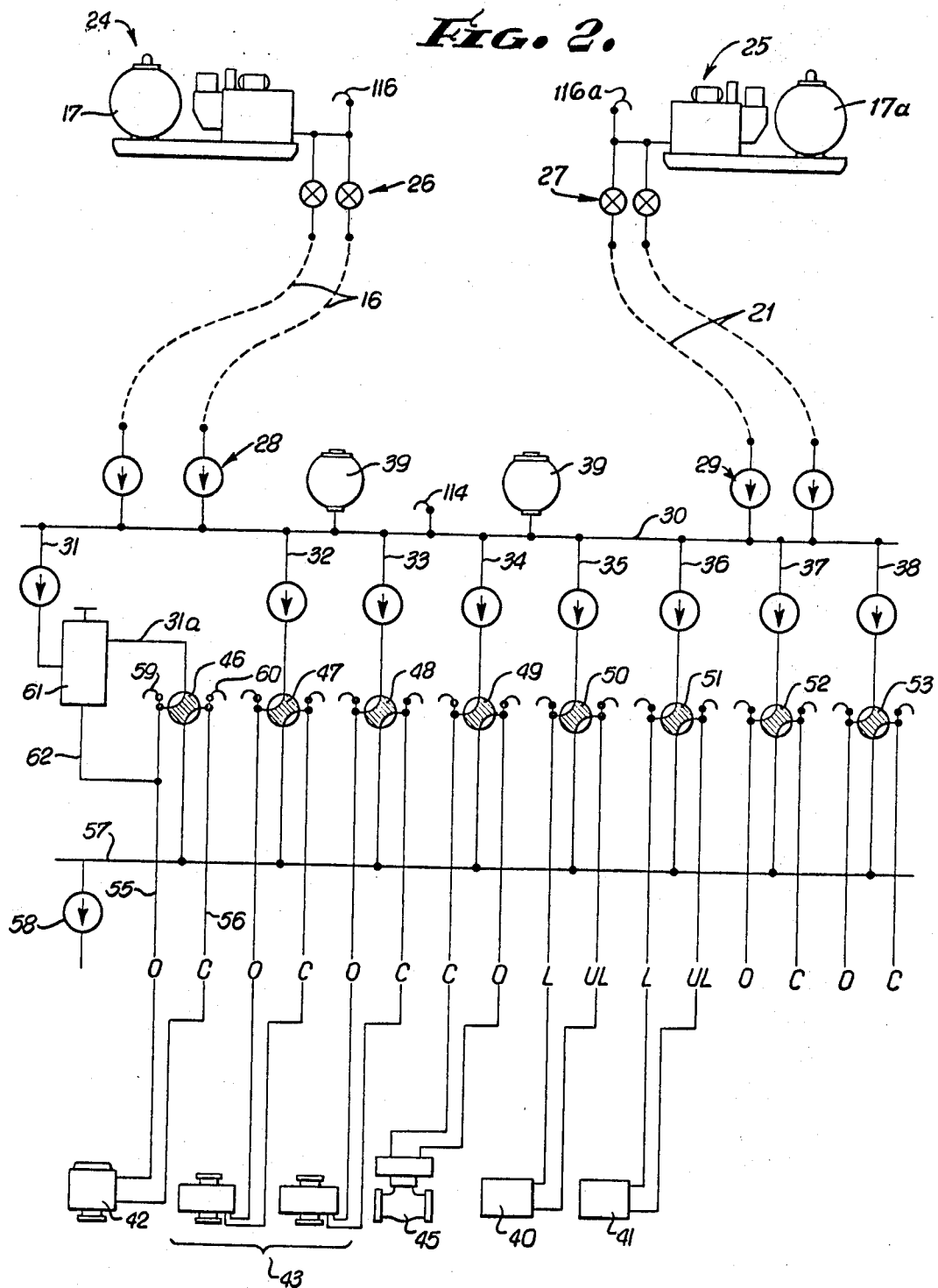

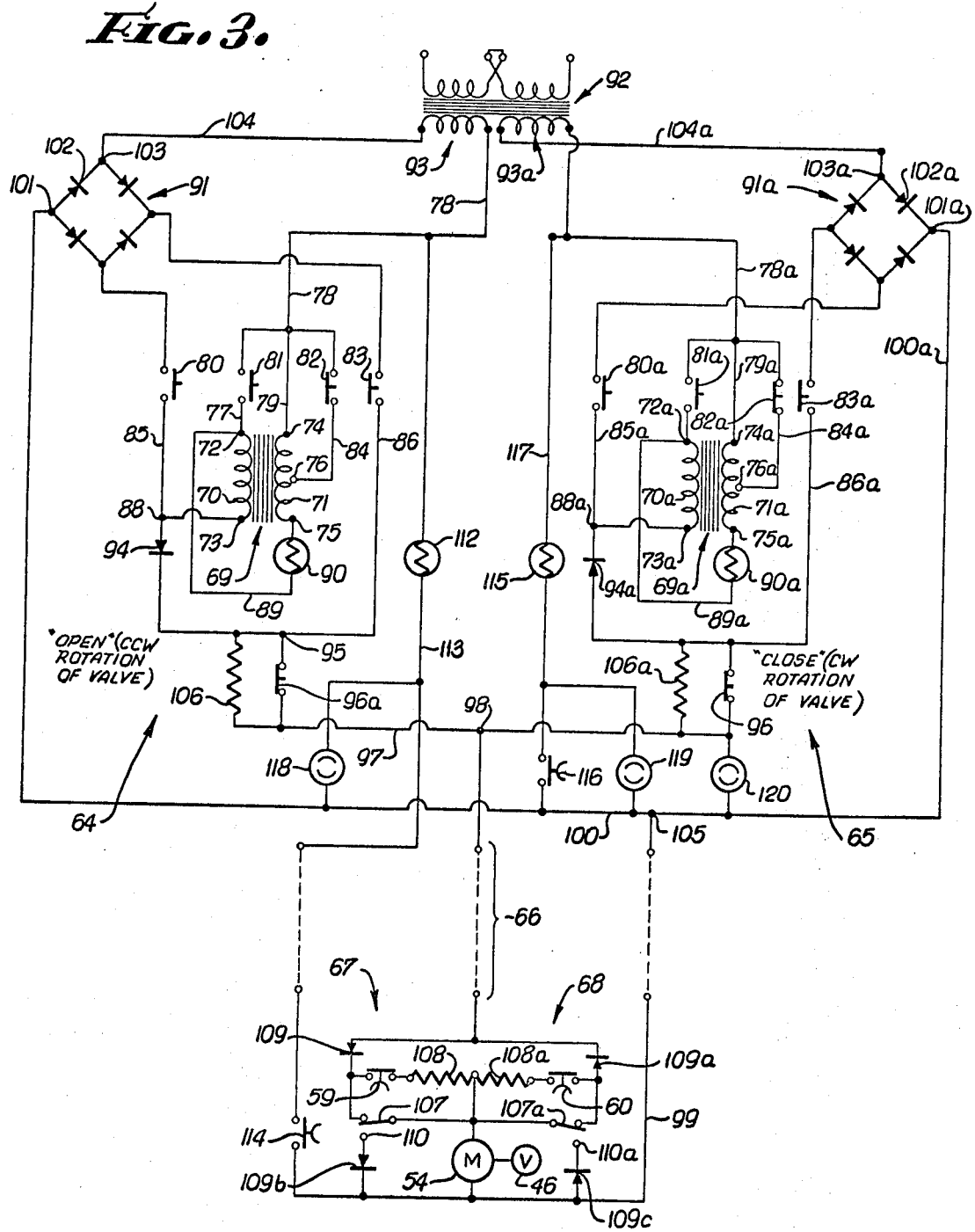

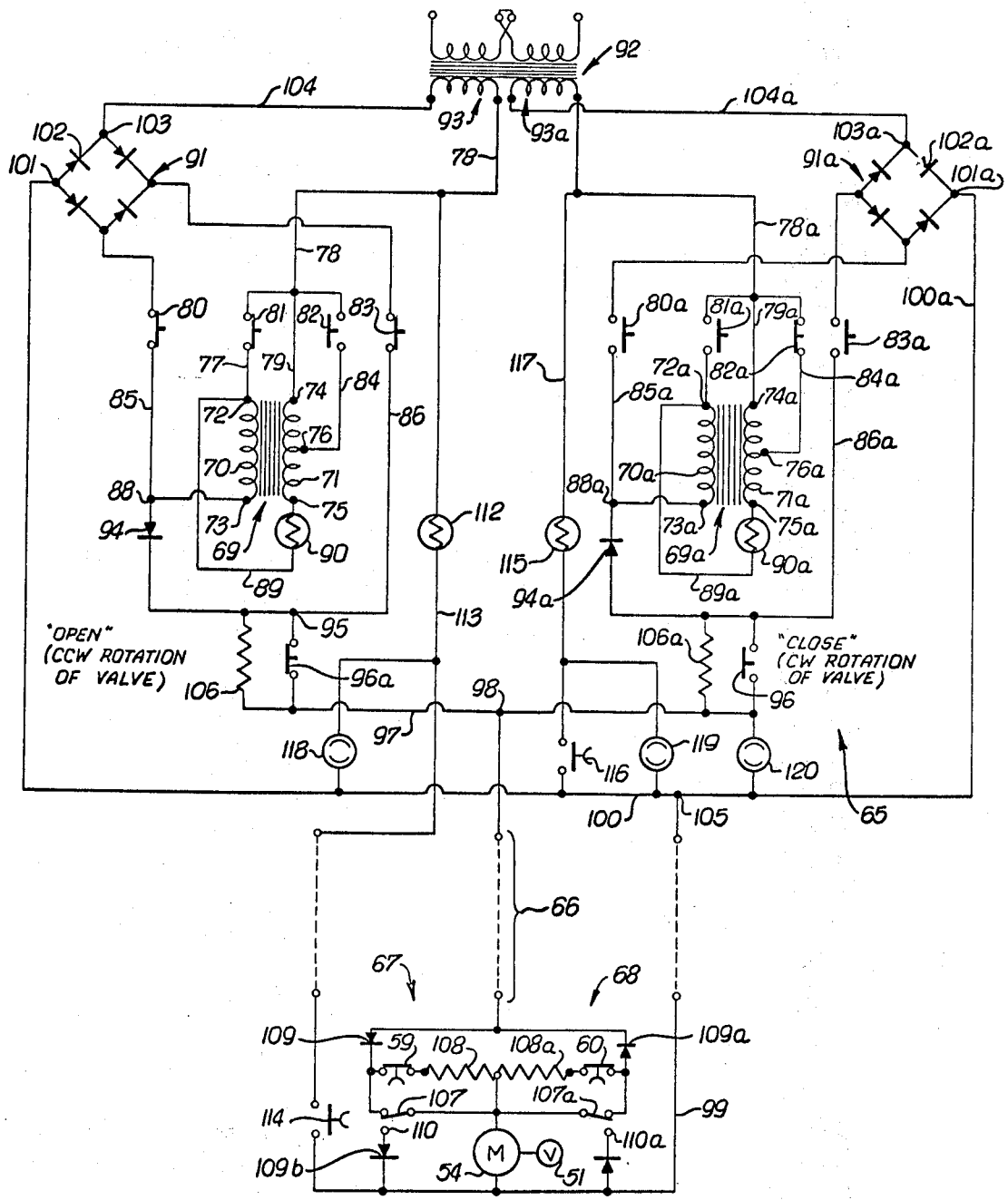

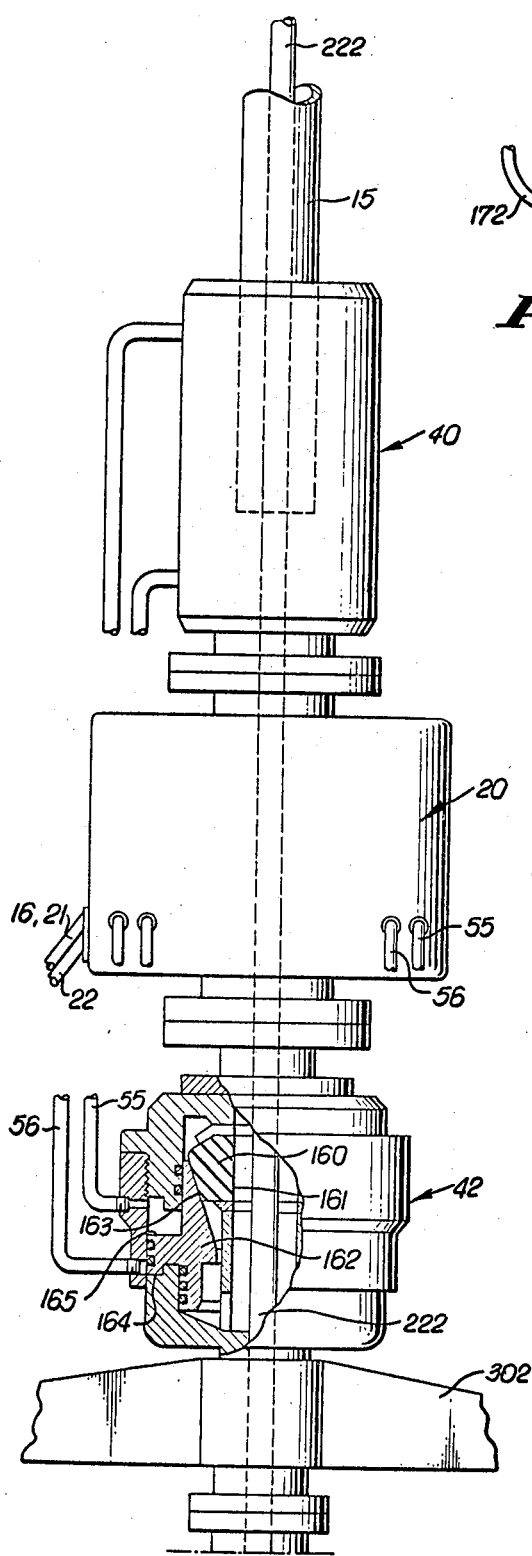
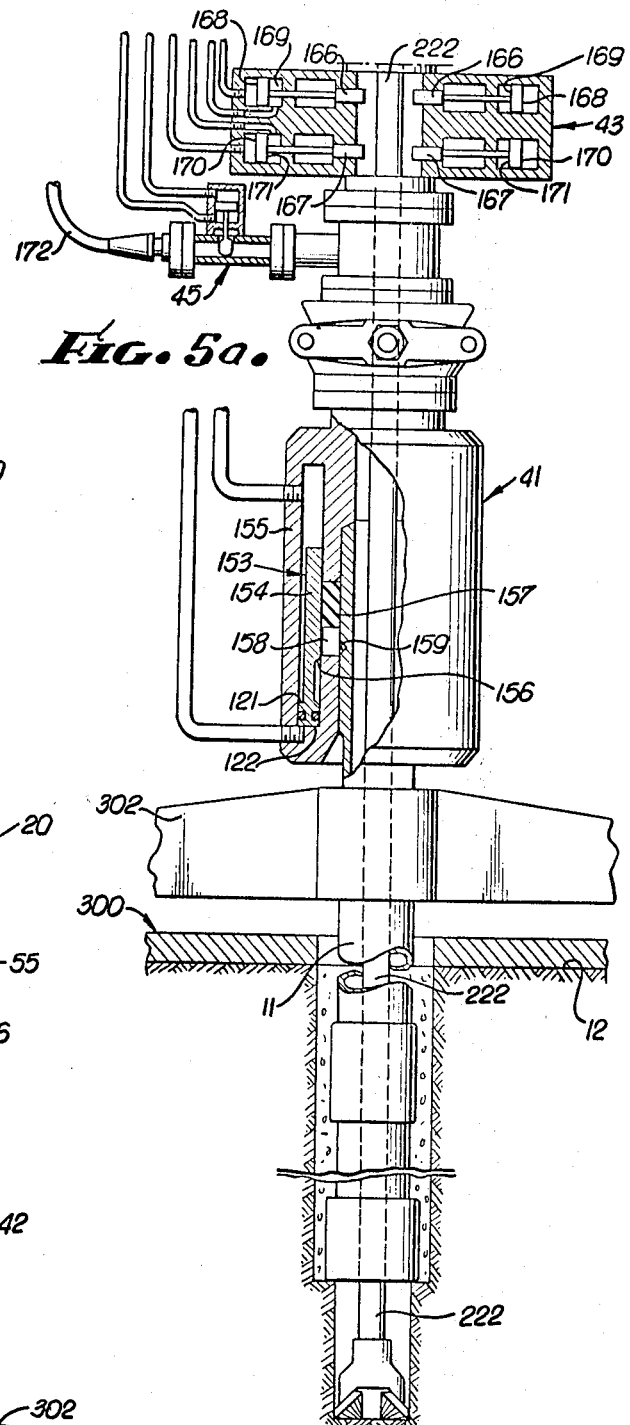

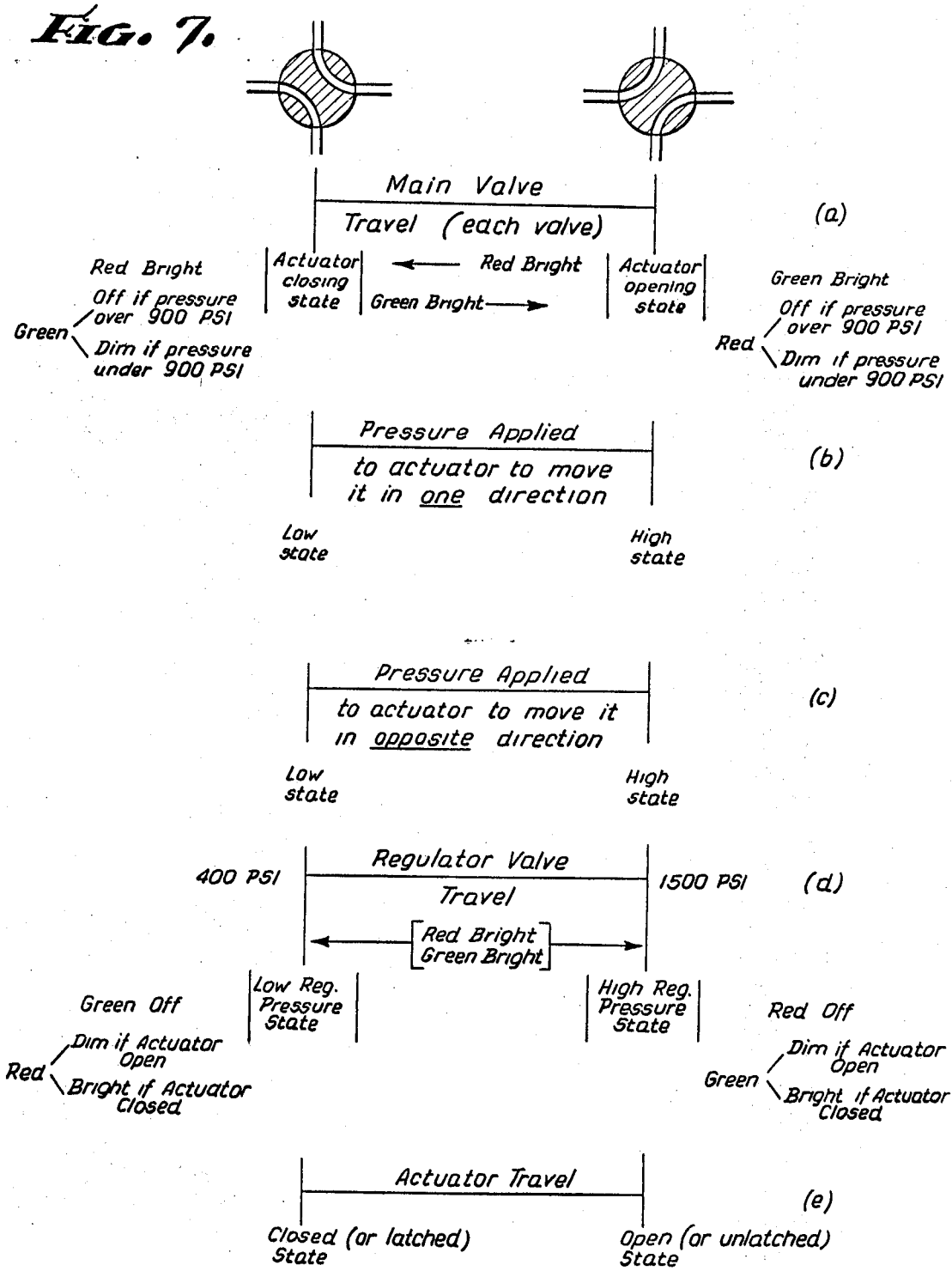

3,516,491
UNDERWATER CONTROL SYSTEM
George E. Lewis, Arcadia, Calif., assignor to Hydril Company, Los Angeles, Calif., a corporation of Ohio
Original application Oct. 14, 1963, Ser. No. 315,827, now Patent No. 3,353,594. Divided and this application June 28, 1967, Ser. No. 661,486
Int. Cl. E21c 19/00
U.S. Cl. 166—.6    9 Claims

ABSTRACT OF THE DISCLOSURE

The invention concerns the remote operation, from a surface station, of electrically responsive means including valving for controlling delivery of fluid pressure to actuator apparatus at a submarine well head location, the occurrence of sub-surface valving change of state being detected at the surface and with minimum wiring.

BACKGROUND OF THE INVENTION

This divisional application is based on that certain application for U.S. Letters Patent Ser. No. 315,827, filed Oct. 14, 1963, now U.S. Pat. 3,353,594 issued Nov. 21, 1967.

This invention relates generally to the control of fluid pressure responsive actuator apparatus at submarine well head locations. More particularly, it concerns improvements in system, apparatus and method to effect such control, with reduced numbers of electrical conductors running from the surface control station to the underwater well head location.

In certain underwater well drilling or producing operations it is desirable to service the well as by means of a tool or a string of tools connectible to a projecting well fitting, such as a submarine stub casing terminating above the ocean floor. As an example, where well casing has already been sunk in the submarine hole with the free end of the casing projecting above the ocean floor, it is desirable to provide for the controlled operation of blowout prevention equipment, safety valves, safety joints or connectors, as well as other auxiliary apparatus, all connected in a string and attached to the projecting well casing, in order to serve the well. Commercial equipment of this nature is generally fluid pressure operated, and it has heretofore been considered necessary to provide a bundle of separate pressure hoses or conduits extending underwater from a surface location to the tools so that independent operation thereof might be achieved as desired. However, the large number of hoses required to supply fluid pressure to multiple tools at the underwater well head creates problems such as the tendency of underwater currents to deflect pressure lines or conduits, such deflection being greater as the size of the hose bundle increases, and such deflection creating further problems of entanglement with underwater equipment, particularly where the submarine well head is a considerable distance below the surface, and the tendency of the water pressure at greater depths to collapse the flexible fluid pressure conduits. Also, the greater number of fluid pressure lines, the greater is the risk of rupture of one or more such lines, leading to stoppages in drilling or producing the well.

In my co-pending application for U.S. Letters Patent, Ser. No. 165,742, now Pat. No. 3,219,118, issued Nov. 26, 1965, I described a solution to the above problems, which contemplated a substantial reduction in the number of long multiple pressure lines independently serving different tools in the underwater string at the well head location. That invention made possible the use of a single fluid pressure supply conduit extending below the surface to the well head location, by providing electrically responsive means at the well head for controlling the flow of fluid pressure from the single pressure conduit to different tools. The described circuit required a pair of electrical conductors and a common return line running from the surface to the prime mover circuit for each tool control valve, one conductor associated with prime mover operation in one direction and the other conductor associated with prime mover operation in the opposite direction. The present invention represents a further improvement of unusual character, since the number of required electrical conductors is substantially further reduced, without impairing the functions of the underwater actuators or tooling. Furthermore, such reduction reduces the size of the cable and hoses and overcomes problems of handling such conductors both in the water and on reels, and also diminishes the chances of failure of conductors in the bundle, there being fewer conductors to fail.

SUMMARY OF THE INVENTION

Accordingly, it is a major object of the invention to provide an improved control system including first means to deliver pressure at the well head location, electrically responsive second means for controlling delivery of fluid pressure between said first means and actuator apparatus at the well head, the second means including electrical prime mover operated valving movable in different modes to effect said control, and a loop circuit including selectively energizable control sections remote from the underwater valving multiple branches connected with the prime mover, rectifier means and a single transmission and return line or conductor electrically connected between the sections and branches for effecting valving movement in one mode in response to current flow through one section, the transmission line and one branch, and for effecting valving movement in another mode in response to current flow through the same line and another section and branch. More specifically, the underwater circuit for each actuator valve prime mover includes a pair of branches electrically connected in parallel between the transmission line and prime mover, and the surface circuit sections include rectifiers to conduct current passing in one direction through one surface section, the connecting line and one underwater branch to the prime mover, and alternatively to conduct current passing in the opposite direction from the prime mover through the other underwater branch, the transmission line and other surface section.

It is another object of the invention to provide in the above novel and unusual circuit certain limit switches for the purpose of interrupting the transmission of valve prime mover current when the valving has reached actuator closing and actuator opening states, and also to provide resistors and pressure switches to pass a current at reduced value whenever pressure application to the actuator is below predetermined level and to interrupt current transmission when the pressure application reaches said level. In this regard, indicators are placed in the surface circuit in novel manner to indicate said interruption of current flow and current flow at reduced value, all in proper sequence to correspond to changes in valve movement and in pressure application to the actuator in response to valving movement.

It is a further object of the invention to provide an improved system incorporating a pressure regulator valve connected in series with a main valve as described above, the regulator valve prime mover also being controlled as to moveemnt in different modes by current passage through a second single transmission line from the surface to the underwater location. More specifically, the regulator valve circuit is operable to effect regulator valve movement in what may be characterized as an increased forwardly delivered pressure mode in response to current flow in one direction through the second transmission line, and to effect regulator valve movement in a decreased forwardly delivered pressure mode in response to current flow in the opposite direction through the second transmission line or conductor. Accordingly, the main valve transfers high or low pressure to the actuator, either to open it or close it, as controlled by current flow through a single loop conductor extending between the surface and the underwater well head location.

The method contemplated by the invention is directed to the remote operation from a surface station of an electrically responsive means including valving for controlling delivery of fluid pressure to actuator apparatus at a submarine well head location. Included in this method are the unusual steps of effecting transmission of an electrical signal from the surface station to the underwater electrically responsive means, thereby to change the state of said valving to effect a selected mode of pressure delivery to the actuator required to change the operating state of the actuator, and detecting at the surface station the occurrence of the valving change of state and upon interruption of the signal. More particularly, operation control is typically carried out by transmitting current flow of first one polarity and then opposite polarity to change the states of the valving, thereby to effectuate first one mode and then another mode of pressure delivery to the actuator whereby its state is changed between open and closed. Other unusual steps of the method include detecting at the surface station the presence or absence of delivery to the actuator of a predetermined pressure level in that mode of pressure delivery effected by the valving change of state, and adjusting the level of pressure to be applied via the valving to the actuator. An unusual way of carrying out the detection steps particularly suited for efficient performance and conveyance of needed information is first to observe the luminous output of a surface station light reduced from a higher to a lesser level (typically non-luminous) indicating that the valving has changed its state, and then to observe the output of said light reduced from an intermediate level to a lesser level (typically non-luminous) indicating that the pressure applied to the actuator has reached a predetermined level sufficient to operate the actuator.

These and other objects and advantages of the invention, as well as the details of an illustrative embodiment, will be more fully understood from the following detailed description of the drawings, in which:

FIG. 2 is a diagrammatic presentation of the fluid pressure system;

FIG. 3 is a diagrammatic presentation of underwater electrically responsive means for controlling delivery of fluid pressure via valving to actuator apparatus, and a typical circuit for effecting valving movement in different modes, the circuit being shown in standby condition;

FIG. 4 is a view like FIG. 3, but showing one section of the circuit in operating condition;

FIG. 5 and FIG. 5a show an elevation, partly in section, taken through a typical string of well servicing tools and actuators therefor;

Figure 6:
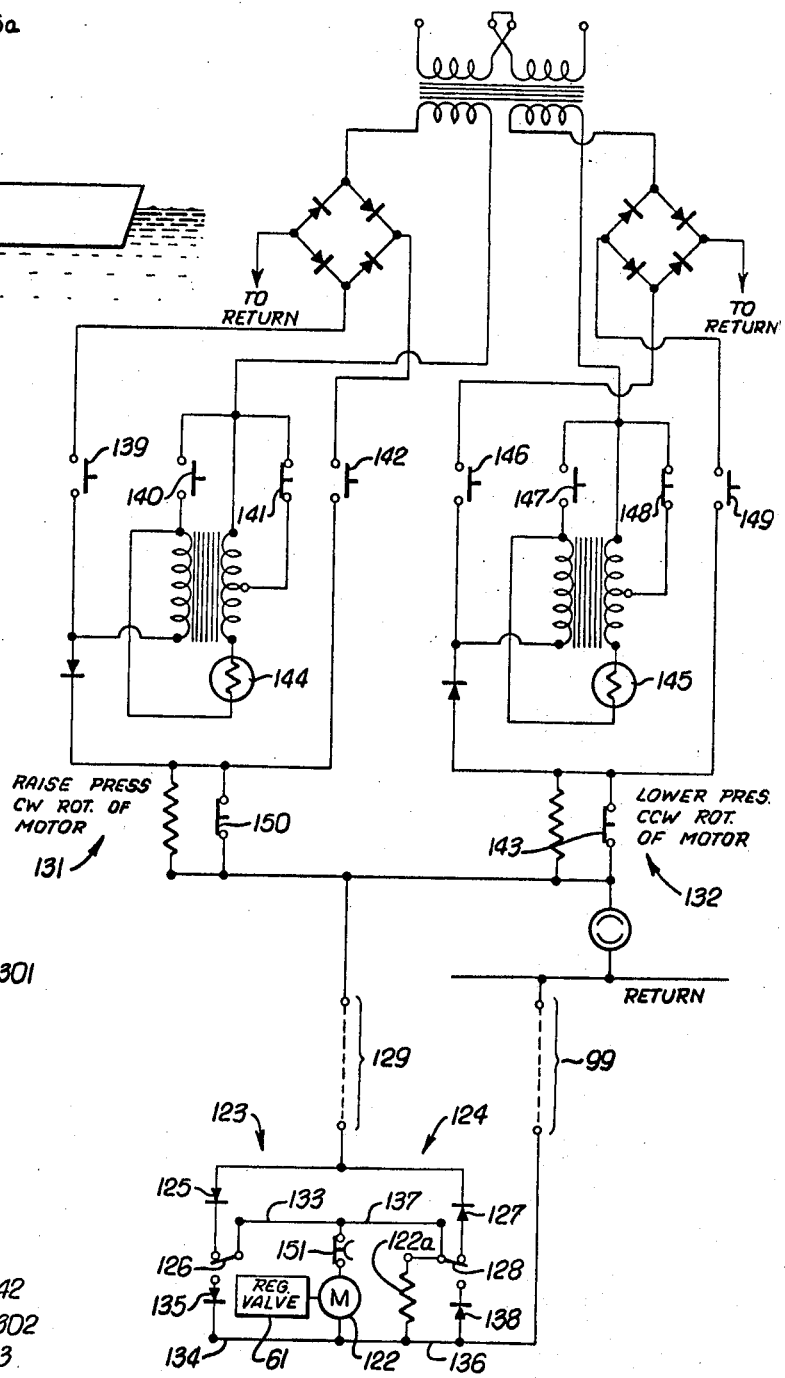

FIG. 6 is a diagrammatic presentation of an underwater electrically responsive means for controlling delivery of high or low pressure via regulator valving to the actuator apparatus via main valving, and a typical circuit for effecting regulator valving movement in different modes; and FIG. 7 is a schematic representation of the different states of main and regulator valves, a typical actuator, and of the pressure application to the actuator to move it in opposite directions.

Figure 1:
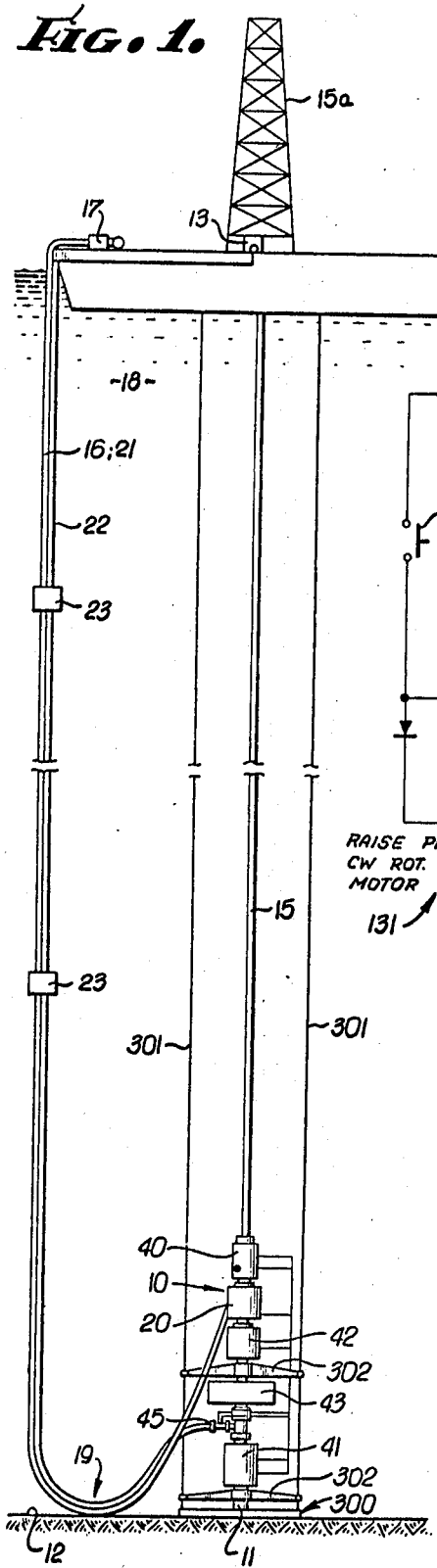
FIG. 1 is an elevation showing a string of well servicing tools at a submarine well head location, and beneath a surface servicing station or vessel.

Referring first to FIG. 1, a string of fluid pressure operable well servicing tools is generally designated by the numeral 10 at a submarine well head location, the well head being identified by a casing stub 11 which projects above the ocean floor 12. The tool string 10, which is more completely shown in FIG. 5, typically comprises an integrated assembly of tools to be controlled from the ocean surface, as represented by well tubing extending downwardly within upper casing 15 below a derrick 15a on the vessel, and to the tool string 10.

Fluid pressure is delivered by means including supply conduits 16, usually flexible, which extends downwardly from a surface accumulator unit 17 and below the surface of the ocean 16 to ultimately bend at 19 toward the tool string near the ocean floor. FIG. 1 shows the fluid pressure delivery means to include an underwater fluid pressure manifold chamber 20 connected in the tool string 10 for receiving fluid pressure from the conduits 16. In accordance with the invention only one or two fluid pressure conduits 16 need be provided, although the invention contemplates the provision of an auxiliary or stand-by conduit or conduits for use in the event of malfunction of the conduits 16. Such standby conduits 21 as well as the principal conduits 16 are shown diagrammatically in FIG. 2.

As will be described, electrically responsive means, typically including electrical prime mover operated valves located in the manifold chamber 20, are provided for controlling the flow of fluid pressure via the fluid pressure delivery means to the tools in the string 10. Energization of the electrically responsive means is controlled by circuit means which includes cable 22 extending below the water surface for electrical connection with the electrically responsive means. Such cable is shown in FIG. 1 as running alongside the conduit 16, the cable typically containing parallel transmission lines or wires through which current is flowable to the valve prime movers integrated within the manifold chamber 20. It will be understood that operation of the valve prime movers, or their equivalents, is electrically controlled from the station 13, as will be described.

FIG. 1 also shows the use of floats such as float chambers 23 located at different elevations below the ocean surface and suitably connected to the cable and conduit group or bundle. Such floats are useful to relieve the hanging load imposed on the conduit 16 and 21 and cable 22 by suspension of extreme lengths of the cable and conduit, where the string 10 to be serviced is located at extreme depths.

DELIVERY OF FLUID PRESSURE AT WELLHEAD

Turning now to FIG. 2, it will be seen that fluid pressure is applied downwardly through the hose or conduiting 16, or alternately through the stand-by piping 21 from the surface pressure supply sources, including the primary supply 24 including accumulator 17 and the stand-by or secondary supply 25 including accumulator 17a. The fluid is transmitted through valves 26 and 27, check valves 28 and 29, and to a pressure line 30 from which branch lines 31–38 are supplied with fluid pressure, such lines typically contained in unit 20. An accumulator 39 is connected into the line 30 in such a way as to supply the common pressure to the branch lines, and store hydraulic fluid under pressure in sufficient volume to secure the desired quick and positive operation of the different tool actuators at the well head location. In this connection, the surface sources of pressures 25 and 26 operate to maintain the pressure in the accumulator 39 at the desired high level.

VALVING CONTROL OF FLUID PRESSURE DELIVERY TO ACTUATORS

Although many different pressure responsive tools may be included in the tool string or stack, the latter typically includes upper and lower well head connectors or safety joints 40 and 41, well blow-out preventer 42 and dual ram type preventers 43, and a "kill-line" or mud valve 45, all of which will be described later in greater detail.

The manifold chamber seen at 20 in FIGS. 1 and 5, typically houses a system of electrical prime mover valves generally designated at 46–53 in FIG. 2, these being connected in pressure application controlling relation with the actuators for the tools 40–45 mentioned above. Each of the valves is typically of four-way construction as diagrammatically illustrated, but in some applications may be a three-way or shutoff type valve. The valves may be considered as included within the category of electrical responsive means for controlling delivery of fluid pressure between the pressure source, as typically represented by the accumulator 39, and the actuator apparatus for the tools 40–45, a typical electrical prime mover for the valve 46 being shown as a motor 54 in FIG. 3.

In the configuration of the representative valve 46 seen in FIG. 2, fluid pressure is supplied via line 31a and through the valve to the open line 55 and to a first actuating surface 165 (seen in FIG. 5) within the blow-out preventer 42. At this time, fluid may escape away from a second actuating surface 164 within the preventer 42 through a line 56 and back through the valve 46 to sub-surface discharge porting represented at 57, for delivering exhausted fluid pressure to the ocean through check valve 58. Conversely, when the valve 46 is actuated to its alternate position or state, fluid pressure will be delivered from line 31a to line 56 and to the mentioned second actuating surface 164 within the housing of the preventer 42. At such times, pressure may escape away from the first actuating surface 165 through line 55 to the porting 57 and check valve 58 for discharge line to the sea. This described operation is also characteristic of the operation of the other valves 47 to 53, and of the tools 40, 41 and 43–45, certain of which have "open" and "close" pressure lines as indicated by the letters O and C, while others latch and unlatch as indicated by the letters L and UL. Accordingly, the system is so constructed that fluid pressure delivery is essentially one-way, no return lines for carrying fluid pressure back to the surface being required. Also, the check valves 28 and 29 prevent release and escape to the sea of pressure from the accumulator 39 and the actuators for the tools 40–45 in the event of accidental overhead rupture of the pressure hoses 16 or 21, as by storm action.

FIG. 2 also illustrates the provision of pressure switches diagrammatically shown at 59 and 60 for the lines 55 and 56, and to be actuated in response to predetermined build-up of fluid pressure application through said lines to the respective actuating surfaces within the preventer 42. Accordingly, upon predetermined build-up of such pressure application through line 55, the switch 59 will be actuated or tripped for purposes to be described, since the pressure in the line 55 will be applied to the switch 59. The same is true as respects the application of predetermined pressure to the switch 60 connected into pressure line 56, and with respect to other similar switches shown connected into the pressure lines for the remaining tool actuators.

Finally, FIG. 2 shows the inclusion of a pressure regulator valve indicated at 61 connected in series between the branch 31 and 31a to the valve 46 controlling the blowout preventer 42. The valve 61 is of the type characterized in that it is movable in one mode to establish a relatively high regulated pressure delivery, and in another mode to establish a relatively low regulated pressure delivery. A typical commercial valve of this nature is that having type number GK supplied by Hydril Company.

The operation of the regulator valve to control the fluid pressure supplied to actuator valve 46, and blowout preventer 42 is described in Pat. No. 2,524,264, issued to Granville S. Knox. Occasionally a valve of this type may develop a slight leak, presenting a problem since it is located at the ocean floor where the leaks cannot be corrected. To remedy this, the return line 62 for valve 61 is connected to the opening line 55 for valve 46. In this way all fluid from the regulator valve will be isolated when the actuator valve 46 is in the blowout preventer open position, as shown in FIG. 2. Since the actuator valve 46 will be in this position most of the time, the system will be left in a condition to avoid reduction of accumulator fluid pressure and the system pressure, in case regulator valve 61 should develop a leak. Further, if the regulator valve is allowed to leak for a long period of time, as could be the case in an actual drilling operation, a minor leak could become a major leak and the valve become inoperative when needed to regulate the pressure when the actuator valve 46 is moved to the blowout preventer closed position. When the actuator valve is moved to the blowout preventer closed position, the opening line 55 will be connected to the discharge porting 57 through valve 46, and the regulator valve will function in its normal manner. When the actuator valve 46 is in the blowout preventer open position, pressure on the return line to the regulator valve 61 will make this valve inoperative. For this reason a contact 151 is provided on pressure switch 59 which will prevent the electrical prime mover of valve 61 from being operated when there is pressure on lines 62 and 55.

CIRCUITRY TO CONTROL VALVING

Turning now to FIG. 3, the loop circuit means to control the typical prime mover 54 for a valve such as 46 is illustrated to include control sections generally indicated at 64 and 65 remote from the prime mover 54, for example at the surface. The circuit also is shown to include a single transmission line 66 electrically connected between the sections 64 and 65 and the prime mover 54. In this regard, it will be understood that the circuit sections 64 and 65 are selectively energizable to effect valving movement by the prime mover in one mode in response to current flow through the line 66 and one section 64, and for effecting valving movement in another mode in response to current flow through the line 66 and the other section 65. More specifically, the circuit includes branches generally designated at 67 and 68 electrically connected with the prime mover 54 and remotely, for example underwater, from the sections 64 and 65. Also, the prime mover and valve are movable in one mode in response to current flow in one direction through section 64, the line 66 and branch 67, and in another mode in response to current flow in the opposite direction through branch 68, line 66, and section 65.

A typical section 64 at the surface includes an iron core transformer 69 having primary and secondary coils 70 and 71, coil 70 having end terminals 72 and 73 and coil 71 having end terminals 74 and 75 as well as an intermediate tap or terminal 76. A line 77 connects terminal 27 with the main power line 78 supplying all the circuit sections when switch 81 is closed, and a line 79 connects the terminal 74 with the main line 78.

Typically hand operated, gang-connected, control switches are shown at 80–83 and 96, switches 82 and 96 being closed when 80, 81 and 83 are open during stand-by, and 82 and 96 being open when 80, 81 and 83 are closed during active operation of section 64. The normal stand-by state of the switches as shown is typically established by spring loading them. Switch 81 is in series in line 77; switch 82 is in series in a line 84 connecting tap 76 with supply line 78; switch 80 is in series with a line 85; and switch 83 is in series with a line 86. Terminal 73 is connected at point 88 with line 85 and a line 89 is run from terminal 72 to terminal 75 of the transformer, there being a red indicator light 90 connected in series in line 89.

The section 64 also includes a rectifier bridge, generally indicated at 91, for rectifying the alternating current from transformer 92 to travel in one direction between the section 64 to the prime mover 54 through line 66. Thus, during stand-by operation of section 64, current pulses traveling to the right in secondary winding 93 of transformer 92 pass through supply line 78, line 79, coil 71, indicator 90, line 89, coil 70, point 88, rectifier 94 in line 85, junction 95, closed switch 96a and line 97 to junction 98 at the head of transmission line 66. After flowing downwardly through line 66 and branch 67 to the prime mover 54, current returns through lines 99 and 100, (line 99 being common to all subsea stations) to the terminal 101 of the bridge, for return to the coil 93 of transformer 92 via rectifier 102, bridge terminal 103 and line 104. Current pulses traveling to the left in secondary winding 93 of transformer 92 are blocked by bridge rectifier 102 and open switch 83 in line 86.

Similarly, during stand-by operation of the other section 65 of the circuit, the elements of which have the same numbers (with suffix a added) as the elements of section 64, current pulses traveling to the left in secondary winding 93a of the transformer 92 pass through line 104a to terminal 103a of the bridge 91a, then through rectifier 102a and terminal 101a to line 100a, then to return junction 105 at the head of return conductor 99, then through the latter, motor 54, branch 68 and up transmission line 66 to junction 98. Current then travels through closed switch 96, rectifier 94a to point 88a in line 85a, to terminal 73a of transformer 69a, primary coil 70a, terminal 72a, jumper 89a, green indicator light 90a, secondary coil 71a, lines 79a and 78a back to coil 93a. Current pulses traveling to the right in secondary coil 93a are blocked when they arrive at point 88a in view of opposing rectifier 102a and open switches 83a in line 86a.

It will be understood that the secondary coils 93 and 93a of the input transformer 92 are connected to develop opposite polarity voltages for application to the stand-by circuits as described above, whereby current pulses through section 64 via junction 98 through section 65 will have a net voltage of zero. It will also be noted that during the stand-by condition described above and shown in FIG. 2, the pilot or indicator lights 90 and 90a are in series with all elements of the circuits, and the power supplied to the prime mover 54 is then less than that required to effect operation thereof. The lights therefore show the observer that the circuits are complete and ready to operate. Finally, in the event switch 96a is opened, as by manual operation of gang-connected switches 80a, 81a, 82a, 83a and 96a, placing section 65 in operating configuration as described below, the added impedance of resistor 106 is placed in series with the stand-by circuit section 64 through red indicator lamp 90. Conversely, in the event switch 96 is opened, as by manual operation of gang-connected switches 80-83 and 96, placing section 64 in operating configuration, the added impedance of resistor 106a is placed in series with the stand-by section 65 through green indicator lamp 90a. The addition of resistor 106 to the stand-by circuit of 64 when section 65 is in the operating condition, and of resistor 106a to the stand-by circuit of 65 when section 64 is in the operating condition, will provide the necessary voltage drop in one section to compensate for the voltage added between points 98 and 106, when the other section is placed in the operating condition. Normally the voltage between points 98 and 105 is low (for example, one to two volts), being that of the voltage drop of the pilot light current through the impedance of the motor 54. When one section, such as 65, is placed in the operating condition, the voltage between points 98-105 then will be approximately 110 volts, which is additive to the stand-by voltage of section 64 and must be compensated for as by the insertion of resistor 106 to maintain the voltage on red lamp 90 at its normal stand-by value while section 65 is operating.

Operating configuration of section 64 is better seen in FIG. 4, with current passing directly through switch 81, coil 70, and terminal 73 to operate the prime mover 54 in a direction turning the valve 46 to actuator "opening" state, for example. At such time, the red pilot light 90 comes on bright due to induced current flow in coil 71, then through the light 90, line 89, switch 81, line 79 and back to the coil 71. The red pilot will stay on bright as the valve 46 is operated to actuator opening state, and the problem then becomes one of determining whether the pressure applied to the actuator rose sufficiently to open the actuator in response to valve movement.

The above problem is solved by providing limit switches 107 and 107a in the respective underwater branches 67 and 68, switch 107 positioned to open when the valve 46 has moved to actuator opening position and switch 107a opening when the valve has moved to actuator closing position. Also, resistances 108 and 108a are located in the respective branches and in parallel with the respective limit switches. Rectifiers 109 and 109a are connected at the input and output sides of the respective branches. When switch 107 is open, a voltage drop occurs at resistor 108, reducing the voltage at the red indicator 90 and causing it to dim (typically non-luminous) thereby showing to the observer that the valving 46 has reached actuator opening state. Conversely, when switch 107a is open, green indicator 90a dims. When switches 107 or 107a move from the closed position as shown in FIG. 3, they move to closed position at contact 110 and 110a establishing dynamic braking circuits 109b and 109c to stop the motor by absorption of the counter EMF generated voltage.

In addition, the branches include the aforementioned pressure switch 59 in series with resistance 108 and in parallel with limit switch 107, and aforementioned pressure switch 60 in series with resistance 108a and in parallel with limit switch 107a. When valve 46 is in the blowout preventer open position, limit switch 107 will be open. Pressure switch 59 and resistor 108 will then be in series with motor 54. The current then drawn through coil 70 will be reduced by resistor 108 to such a low value that the reduced voltage in 71 applied to red pilot light 90 will cause light 90 to become non-luminous. When switches 80-83 and 96 are spring returned to the stand-by condition, as shown in FIG. 3, resistor 108 in series with red light 90 will cause it to burn dim. When pressure in line 55, FIG. 2, is sufficient to operate blowout preventer 42 to open position and to open the pressure switch 59, switch 107 being open, red indicating light 90 will go out showing that pressure above a predetermined minimum (900 p.s.i. by selection) is applied to the actuator for tool 42 for actuator movement in one mode. Conversely, when the green light 90a goes out, it indicates pressure application above a certain minimum to the actuator for tool 42, to operate it in another mode. If the pressure application to the actuator is below said minimum, the red or green pilot light as the case may be will stay on dim, whereby the observer then knows he should check to see if there is sufficient pressure in accumulator 39, as shown by the state (say "on" condition) of an indicator lamp 112 in series with another conductor 113 connected between power line 78 at the surface and return line 99 at the bottom or well head location. A pressure switch 114 (see also FIG. 2) in line 113 is closed if the pressure in the accumulator 39 is above a predetermined level, say 1350 p.s.i., and is otherwise open, breaking the circuit through the lamp 112. Therefore if lamp 112 is out, the operator should then check the surface pressure source 24 used to re-charge the bottom accumulator 39. Another indicator lamp 115 is used to test the pressure in surface source or accumulator 24, there being a pressure switch 116 (see also FIG. 2) in a line 117 in series with the lamp 115 and connected between power line 78a and return 100a. Switch 116 opens when the pressure in source 24 is insufficient, breaking the circuit through lamp 116. Suitable neon test lamps are shown at 118–120 to test the condition of indicating lamps 90, 90a, 112 and 115. The operation of these test lamps may be described as follows. In circuit stand-by condition the impedance between line 66 and common return line 99 will be low compared to the impedance of the indicating lamps 90 and 90a. The voltage of the circuit sections 64 and 65, as previously described, will therefore be shared according to the ratio of these impedances. This will cause the lamps 90 and 90a to burn, but the neon lamp 120 to be in the "out" condition. If limit switch 107 and pressure switch 59 are open, the impedance of section 67 will be high (open circuit to lamp 90), causing lamp 90 to go out. Neon lamp 120 connected from lines 97–100, is of a high order of impedance compared to lamp 90, and will now, by the ratio of the impedances, share the greater part of the voltage and so be luminous while the voltage across lamp 90 will be low and the lamp non-luminous. Should the lamp 90 be defective, the series circuit of section 64 previously described would be open and so cause the neon lamp 120 to become non-luminous. In a similar manner neon lamp 120 serves to test green indicating lamp 90a, neon lamp 119 to test lamp 115, and neon lamp 118 to test lamp 112.

FIG. 6 shows the regulator valve 61 of FIG. 2 as operable by a prime mover 122 in a circuit very similar to the circuits seen in FIGS. 3 and 4, as described above. As pointed out above and as will appear, the regulator valve 61 is movable in one mode by the motor 122 to establish a relatively high regulated pressure delivery to an underwater blowout preventer actuator 42, and in another mode to establish a relatively low regulated pressure delivery to the preventer actuator, typically to close the actuator. As an example, the valve 61 may be adjustable between two limits, the high limit providing 1500 p.s.i. working pressure and the low limit set to stop the motor 122 when the pressure is reduced to 400 p.s.i. for example. In this regard, the prime mover circuit seen in FIG. 6 includes underwater parallel branches 123 and 124, the former incorporating rectifier 125 and high limit switch 126 positioned to open when the valve 61 has moved to establish the high pressure setting. Branch 124 incorporates rectifier 127 and low limit switch 128 which opens when the valve has moved to establish the low pressure setting. Such opening of the switches interrupts current passage through the common transmission 129 and common return line 99 and the surface circuit sections 131 or 132. Also, such opening of switch 126 short circuits the motor 122 around the loop indicated by leads 133 and 134 and in the current direction indicated by rectifier 135 to brake the motor by counter EMP development. Likewise opening of switch 128 short circuits the motor around the loop indicated by leads 136 and 137 in the current direction shown by rectifier 138, to brake the motor. Resistance is seen at 122a connected across the motor, for purposes described below.

The circuit connections and functions of each of sections 131 and 132 will not be described since they are clearly the same as the connections shown in sections 64 and 65 described above. Suffice it to say that FIG. 6 shows the sections 131 and 132 in stand-by condition, and that gang-connected switches 139–143 may be operated to open 141 and 143, and close 139, 140 and 142, thereby causing movement of regulator valve 61 in a mode to establish the high regulated pressure delivery through main valve 46 and the actuator 42, valve 46 then being in its actuator closing state. Switch 126 will then be open and switch 128 closed, so that red indicator lamp 144 will be out and green indicator lamp 145 in section 132 will be on bright. As to the latter, current passes down through the return conductor 99, through resistor 122a and switch 128, and up through rectifier 127, line 129 and lamp 145. At this time, the voltage at the motor 122 will be insufficient to drive it in a direction carrying valve 61 out of its high pressure establishing state. Also, section 132 remains in stand-by state due to spring-loading of its switches to the configuration seen.

Conversely, gang-connected switches 146–150 may be operated to open 148 and 150, and close 146, 147 and 149, thereby causing movement of valve 61 in an opposite mode to establish the low regulated pressure delivery through main valve 46 to the actuator 42, valve 46 also being in its actuator closing state. Switch 128 will then be open and switch 126 closed, so that green indicator lamp 145 will be out and red lamp 144 on bright. As to the latter, current then passes down through section 131, lamp 144, conductor 129, through switch 126 and resistor 122a, and returns via lead 136 and return conductor 99. At this time, voltage at motor 122 will be insufficient to drive it in a direction carrying valve 61 out of its low pressure establishing state, and section 131 remains in stand-by state as shown due to spring-loading of surface switches 139–142. As described previously, contact 151 on pressure switch 59 is arranged to open the circuit to the prime mover 122 when there is pressure applied to lines 55–62. This is to prevent prime mover 122 from being operated when valve 61 has pressure on the return connection 62.

DETAILED ACTUATOR STRUCTURE

Referring now to FIGS. 5 and 5a, the lower and upper well head connectors or slips 41 and 40 respectively serve to detachably connect the string or stack 10 onto the stub casing 11 and to the lower terminal of the upper casing 15 with which the connectors telescopically interfit. The connectors 40 and 41 may each have the construction shown in U.S. Pat. 2,962,096 issued Nov. 29, 1960 to Granville S. Knox. Briefly, each connector includes pipe slip structure 153 movable within a housing 155 between pipe gripping advanced position, as illustrated, and pipe releasing retracted position, in response to application of fluid pressure from the manifold, as controlled by a prime mover operable valve 51. Thus, the structure 153 in the connector 41 is controlled by the valve 51, whereas the corresponding slip structure 153 in the connector 40 is controlled by the valve 50. The structure 153 includes a cylindrical plunger unit 154 movable axially within the cylindrical housing 155 in response to fluid pressure application to one or the other pressure surfaces 121 and 122 associated with the plunger unit. Thus, pressure exertion against surface 121 moves the unit 154 forwardly (i.e. downwardly) so that a cam surface 156 thereof successively urges a sealing annulus 157 against the enlarged portion of casing 11 to create a pressure seal, and then displaces a circular series of locking elements 158 laterally into locking engagement with the casing. As shown in FIG. 5a the elements 158 typically enter a groove 159 in the casing to creat the interlocking condition preventing separation of the connector from the casing. Opposite pressure exertion against the surface 122 releases the interlocking condition and also the sealing engagement of the member 157 with the casing 11, to permit separation of the connector and the string from the casing. Accordingly, it will be understood that the tool string 10 may be detachably connected to or released from the casing stub 11 and also the lower terminal of the upper casing 15, as described. Thus, the upper casing 15 may be released from the tool string by operation of connector 40 to permit upward withdrawal of the casing 15, and also to permit upward withdrawal of the string 10 after release from the stub casing 11, through disconnection of the connector 41 therefrom.

Referring to the blowout preventer unit 42, it may be of the type shown in U.S. Pat. 2,609,836 issued to Granville S. Knox, and is capable of completely closing off all fluid flow upwardly from the well whenever desired and regardless of whether or not the drill pipe or tubing 222 is positioned within the preventer. This device 42 may be typically described as including a massive annular rubber sealing element 160, containing an opening 161 through which the drill pipe 222 or other well apparatus may extend downwardly. The element 160 is adapted to be constricted or cammed radially inwardly to a closed bore sealing condition by upward movement of an actuating piston 162 engaging the element 160 at conical interface 163. The piston is actuable upwardly in response to pressure fluid admission to the underside 164 of the piston. Conversely, the piston is actuable downwardly to its bore open position by pressure fluid admission to the upper side 165 of the piston. The rubber element 160 is sufficiently deformable to conform to and form a seal with the outer surface of any size drill pipe, enlarged joint, non-circular part, or other member which may be received within the preventer. Further, if no such member is present in the preventer when the piston 162 is actuated upwardly, the piston movement continues upwardly until the central opening 161 is completely closed.

Referring to the secondary blowout preventing unit 43–44 it may also be of conventional construction, described very generally as including an upper pair of horizontally opposed fluid pressure actuated pipe rams 166, and a lower pair of horizontally opposed "blind rams" 167, also pressure actuated. These may be contained in one preventer body as shown in FIG. 5a or in separate assemblies as shown in FIG. 2. When pressure is applied against the upper ram piston surfaces 168, the upper rams are actuated relatively together and against the drill string or other pipe 222, so that semi-circular recesses in the two rams 166 embrace the pipe and form a fluid tight seal. Pressure fluid admission to the upper ram piston surfaces 169 causes relative separation of the upper rams. The second set of rams 167 is similar to the rams 166 with the exception that they are "blind" so as to completely close the bore when no pipe or other member is present within the preventer. The latter two rams are actuable relatively together in response to application of pressure against the piston surfaces 170, and are actuable apart by pressure fluid admission against the piston surfaces 171.

FIG. 5a also shows the "kill-line" valve 45 for controlling removal of gas or admission of mud through auxiliary line 172 and the valve from the interior of the string. The gate-type valve 45 contains pressure surfaces for actuating the gate between open and close positions to control introduction of mud to the well in the event it becomes necessary to kill pressure in the well after the blowout preventers have been closed. Line 172 may extend to the ocean surface alongside conduit 16 previously described.

While the string of equipment 10 is shown as installed at the well head, it will be understood that it is first lowered to said location guided by arms 302 on vertical lines 301 leading upwardly to the surface vessel or platform, and engaged with stub casing 11 attached to frame 300, which was previously positioned on the ocean floor.

SUMMARY OF OPERATION

The operation of the system may perhaps best be summarized by reference to FIG. 7 in combination with the other figures and above description. FIG. 7(a) shows the typical states of a main valve such as any of the valves 46–53, and its capacity for travel between said states. The condition of the indicator lights is also placed in FIG. 7(a).

FIGS. 7(b) and (c) diagrammatically and respectively show the high and low states of pressure application to the actuator to move it in opposite directions. FIG. 7(d) is like FIG. 7(a), but shows the states of the regulator valve 61, its capacity for travel between said states, and the condition of the indicator lights 144 and 145 seen in FIG. 6. Finally, FIG. 7(e) shows the open and closed (or unlatched and latched) states of the actuator such as any of the actuators associated with the tools 40–45, and the capacity for actuator travel between said states.

If I start with the full 1500 p.s.i. applied to the preventer actuator 42 in the closed position, the green light 145 will be on bright as seen in FIG. 7(d), and the green light 90a in FIG. 3 will be out as seen in FIG. 7(a). It may then be desired to reduce the regulated pressure application to the preventer actuator 42, in which event the switches 146–150 in FIG. 6 will be operated. Accordingly, the red lamp 144 in FIG. 6 will then come on bright, as seen in FIG. 7(d). When the pressure is reduced below 900 p.s.i., a pre-selected value, the green light 90a will come on dim, as is clear from FIG. 7(a), and if we continue to decrease the regulated pressure application, the green light 145 in FIG. 6 will go out, as indicated in FIG. 7(d), showing when the pressure has been reduced to 400 p.s.i., a pre-selected value.

Thereafter, if I desire to increase the regulated pressure application, the switches 139–143 in FIG. 6 are operated, and the green light 143 in FIG. 6 will again come on bright, as is clear from FIG. 7(d). When the pressure reaches 900 p.s.i., the green light 90a will go out, and as the pressure is further increased, the red light 144 in FIG. 6 will go out, indicating a closing pressure of 1500 p.s.i. has again been established. The operator may accordingly determine the time required to adjust the regulator valve between the known indicated values to derive additional approximate pressure settings. From the foregoing, it is clear that by observing the red and green lights of the circuits shown in FIGS. 3 and 6 associated with the preventer actuator 42, the value of the applied pressure may be determined. The condition of the lights during opening of the actuator, as well as during raising and lowering of regulator pressure applied to the open actuator, may likewise be determined from inspection of FIG. 7.

I claim:

1. In the method of remotely operating from a surface station an electrically responsive means including valving for controlling delivery of fluid pressure to actuator apparatus at a submarine well head location, the actuator having different states into which it may be placed in response to changes in the mode of said pressure delivery as effected by the state of said valving, said valving having different states into which it may be placed in response to changes in signals transmitted to said means from said surface station, the steps that include effecting transmission over a control wire of an electrical signal from said surface station to said means thereby to change the state of said valving to effect a selected mode of pressure delivery to the actuator required to change the state of the actuator as desired, and detecting at the surface station the occurrence of said valving change of state, said detection being carried out upon modification of said signal and in response to transmission over said control wire of said modification.

2. In the method of remotely operating from a surface station an electrically responsive means including valving for controlling delivery of fluid pressure to actuator apparatus at a submarine well head location, the actuator having different states into which it may be placed in response to changes in the mode of said pressure delivery as effected by the state of said valving, said valving having different states into which it may be placed in response to changes in signals transmitted to said means from said surface station, the steps that include effecting transmission of an electrical signal from said surface station to said means thereby to change the state of said valving to effect a selected mode of pressure delivery to the actuator required to change the state of the actuator as desired, and detecting at the surface station the occurrence of said valving change of state, said detection being carried out upon modification of the signal, said signal transmission being carried out by transmitting current of first one polarity and then an opposite polarity to said means to change the states of said valving thereby to effect first one mode and then another mode of pressure delivery to the actuator changing its state between open and closed.

3. In the method of remotely operating from a surface station an electrically responsive means including valving for controlling delivery of fluid pressure to actuator apparatus at a submarine well head location, the actuator having different states into which it may be placed in response to changes in the mode of said pressure delivery as effected by the state of said valving, said valving having different states into which it may be placed in response to changes in signals transmitted to said means from said surface station, the steps that include effecting transmission of an electrical signal from said surface station to said means thereby to change the state of said valving to effect a selected mode of pressure delivery to the actuator required to change the state of the actuator as desired, and detecting at the surface station the occurrence of said valving change of state, said detection being carried out upon modification of said signal, and including the step of thereafter detecting at the surface station the presence or absence of delivery to the actuator of a predetermined pressure level in that mode of pressure delivery effected by said valving change of state.

4. The method of claim 3 in which said first detection step is carried out by observing the luminous output of a light reduced from a higher to a lesser level, and said second detection step is carried out by observing the output of said light reduced to said lesser level from an intermediate level between said higher and lesser levels.

5. In the method of remotely operating from a surface station an electrically responsive means including valving for controlling delivery of fluid pressure to actuator apparatus at a submarine well head location, the actuator having different states into which it may be placed in response to changes in the mode of said pressure delivery as effected by the state of said valving, said valving having different states into which it may be placed in response to changes in signals transmitted to said means from said surface station, the steps that include effecting transmission of an electrical signal from said surface station to said means thereby to change the state of said valving to effect a selected mode of pressure delivery to the actuator required to change the state of the actuator as desired, and detecting at the surface station the occurrence of said valving change of state, said detection being carried out upon modification of said signal, and including the further steps of adjusting the level of pressure to be applied via said valving to said actuator.

6. In the method of remotely operating from a surface station an electrically responsive means including valving for controlling delivery of fluid pressure to actuator apparatus at a submarine well head location, the actuator having different states into which it may be placed in response to changes in the mode of said pressure delivery as effected by the state of said valving, said valving having different states into which it may be placed in response to changes in signals transmitted to said means from said surface station, the steps that include effecting transmission of an electrical signal from said surface station to said means thereby to change the state of said valving to effect a selected mode of pressure delivery to the actuator required to change the state of the actuator as desired, and detecting at the surface station the occurrence of said valving change of state, said detection being carried out upon modification of said signal, and including the preliminary step of lowering to said location said means and actuator apparatus, and establishing communication with said means and said surface station through an electrical conductor for transmitting said signals.

7. In the method of remotely operating from a surface station an electrically responsive means including valving for controlling delivery of fluid pressure to actuator apparatus at a submarine will head location, the actuator having open and closed states into which it may be alternately placed in response to changes in the mode of said pressure delivery as effected by the state of said valving, said valving having actuator opening and actuator closing states into which it may be placed in response to changes in signal transmission to said means from said surface station, the steps that include effecting transmission of current of one polarity from said surface station to said means thereby to change the valving from actuator opening to actuator closing state for effecting pressure delivery to the actuator in a first mode required to close the actuator, and detecting at the surface station the completion of valve change of state.

8. The method of claim 7 including the further steps of effecting transmission of current of opposite electrical polarity from said surface station to said means thereby to change the valving from actuator closing to actuator opening state for effecting pressure delivery to the actuator in a second mode required to open the actuator, and detecting at the surface station the completion of valve change of state to actuator opening state.

9. The method of claim 8 including the steps of detecting at the surface station the presence or absence of delivery to the actuator of predetermined pressure levels in each of said modes effected by said valving changes of state.

References Cited

UNITED STATES PATENTS

| | | | |
|---|---|---|---|
| 2,614,803 | 10/1952 | Wiggins | 166—.5 X |
| 2,872,940 | 2/1959 | Lewis | 137—554 |
| 3,012,510 | 12/1961 | Kusner | 251—133 X |
| 3,086,590 | 4/1963 | Jackson et al. | 166—.6 |
| 3,163,224 | 12/1964 | Haeber et al. | 166—.6 |
| 3,186,486 | 6/1965 | Rhodes et al. | 166—.6 |
| 3,199,595 | 8/1965 | Lafitte et al. | 166—.6 |
| 3,211,223 | 10/1965 | Hoch | 166—.6 |

NILE C. BYERS, Jr., Primary Examiner

R. E. FAVREAU, Assistant Examiner

U.S. Cl. X.R.

166—66